(12) United States Patent
Hamaya

(10) Patent No.: US 6,799,250 B2
(45) Date of Patent: Sep. 28, 2004

(54) CACHE CONTROL DEVICE

(75) Inventor: Kota Hamaya, Kanagawa (JP)

(73) Assignee: NEC Electronics Corporation, Kawasaki (JP)

(*) Notice: Subject to any disclaimer, the term of this patent is extended or adjusted under 35 U.S.C. 154(b) by 357 days.

(21) Appl. No.: 10/123,460

(22) Filed: Apr. 17, 2002

(65) Prior Publication Data

US 2002/0156978 A1 Oct. 24, 2002

(30) Foreign Application Priority Data

Apr. 19, 2001 (JP) ........................................ 2001-121109

(51) Int. Cl.[7] ............................................. G06F 12/02
(52) U.S. Cl. ........................ 711/128; 711/117; 711/118; 711/147
(58) Field of Search ................................ 711/117, 118, 711/128, 147

(56) References Cited

U.S. PATENT DOCUMENTS

| | | | | |
|---|---|---|---|---|
| 5,586,300 A | * | 12/1996 | Wilcox et al. | ............. 711/150 |
| 5,845,323 A | * | 12/1998 | Roberts et al. | ............. 711/128 |
| 5,848,433 A | * | 12/1998 | Tran et al. | ............. 711/137 |
| 5,987,561 A | * | 11/1999 | Witt et al. | ............. 711/3 |

FOREIGN PATENT DOCUMENTS

JP      8-263370      10/1996

* cited by examiner

Primary Examiner—T Nguyen
(74) Attorney, Agent, or Firm—McGinn & Gibb, PLLC

(57) ABSTRACT

A cache control device of the invention comprises a first register for holding address data, a second register for holding address data held by the first register at the next timing, caches for receiving address data, comparators for receiving the outputs of the first and second registers, a first multiplexer for selecting data of the comparators, a second multiplexer for selecting data of the caches, and an access controller for controlling the caches, the cache control device having a plurality of ways which are not simultaneously confirmed with regard to coincidence, and selecting in advance one of the address buses prior to comparison of the address buses.

14 Claims, 6 Drawing Sheets

CACHE CONTROL DEVICE

BACKGROUND OF THE INVENTION

1. Field of the Invention

The present invention relates to a cache control device, and more particularly to a cache control device to be used as a set associative cache control device.

2. Description of the Prior Art

It is a well-known fact that in recent years the operating frequency of a general-purpose microcomputer or a digital signal processor (hereinafter, referred to as DSP for short) is made higher and cache devices to be used in them are also made higher in their operating frequency.

It is also a well-known fact that in recent years, among the cache devices described above, a set associative cache device which is used particularly for improving the hit rate of a cache attracts people's attention. Such a conventional cache device is disclosed for example in Japanese Patent Laid-Open Publication No.H8-263370.

The set associative cache device has a higher hit rate in comparison with a direct mapped cache device having the same capacity.

And with the advance of micro-fabrication in a state-of-the-art semiconductor manufacturing process the difference between the speed of a bus in an external storage used in a general-purpose microcomputer or a DSP and the operating speed inside a processor is only more increased. That is to say, the hit rate of a cache memory inside a processor has had a larger influence on performance of the whole processor.

It is expected that after now in order to improve the hit rate of a cache a cache device adopts more frequently a set associative method than a direct mapped method. Furthermore, measures for low power consumption are more intensely demanded in order to adopt a cache device as a processor intended for a portable terminal.

A set associative cache of the prior art is also well known which compares first a way 0 for example and, when no coincidence is encountered, compares the remaining ways instead of simultaneously comparing ways of a set associative cache device in order to meet this demand.

Figure 1:
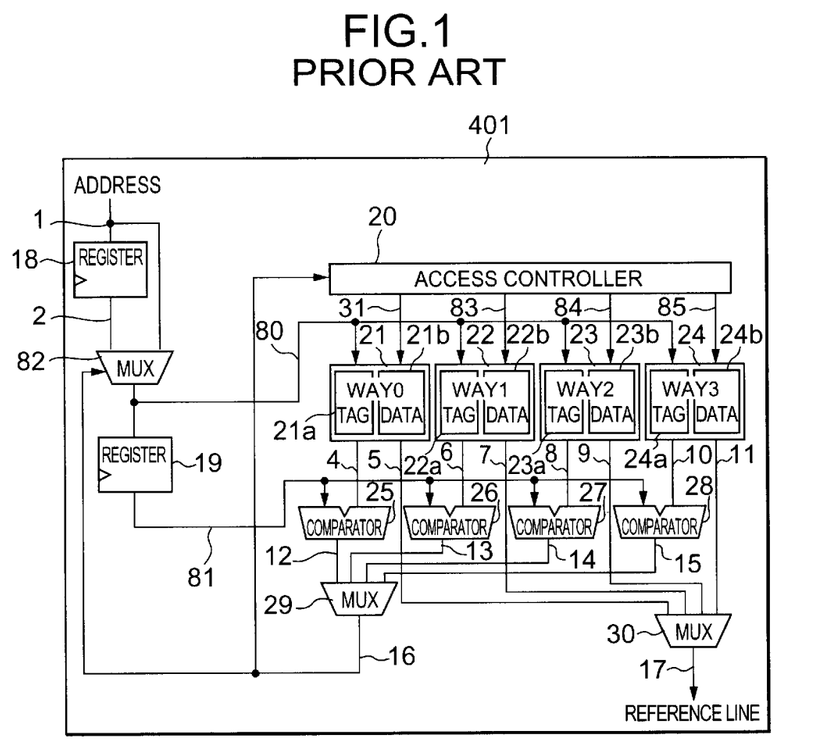
FIG. 1 is a block diagram of a cache control device of the prior art.
Figure 2:
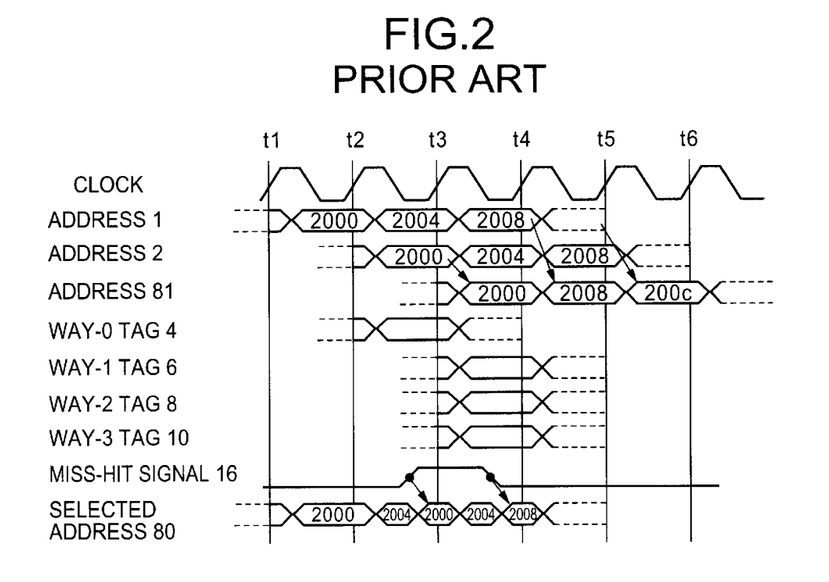
FIG. 2 is a timing chart for explaining the operation of the cache control device of the prior art.

The composition of a set associative cache device of the prior art is shown in FIG. 1 and the timing chart of its operation is shown in FIG. 2.

Referring to FIG. 1, the value of an address bus 80 to be inputted into each of caches (21a, 22a, 23a and 24a) of a set associative cache device of the prior art is not yet defined before the comparing operation of caches, and a selector 82 selects the value of an address bus 1 or the value of an address bus 2.

Due to this, when the comparison of way 0 results in no coincidence, after a miss-hit signal 16 is generated the selector 82 inputs the next address as a signal 80 into ways 1 way to 3. And the address 80 to be inputted into the caches is generated at time t3 in FIG. 2.

However, the above-mentioned cache control device of the prior art has a disadvantage that generation of an address 80 to be inputted into a cache at time t3 in FIG. 2 is delayed and therefore comes to make slower the operating speed of the cache.

SUMMARY OF THE INVENTION

A main object of the present invention is to provide a high-speed cache device being a set associative cache device having ways which are not simultaneously confirmed with regard to coincidence, the set associative cache device adopting a method of selecting in advance an address to be inputted into the cache RAM of each way prior to comparison of each way instead of a method of selecting the address on the basis of a miss-hit signal generated from a result of comparison of a way.

A first cache control device of the present invention comprises;

a first register having a first address bus connected to its input side, having a second address bus connected to its output side, and being driven by a clock signal, a second register having the second address bus connected to its input side and a third address bus connected to its output side, and being driven by a clock signal, a first cache having the first address bus connected to its input side, a second cache each having the second address bus connected to its input side, a first comparator for comparing the output of the second address bus with the output of the first cache, a second comparator for comparing the output of the third address bus with the outputs of the second caches, a first multiplexer for selecting data of the first comparator or the second comparators, a second multiplexer for selecting data of the first cache or the second caches, and an access controller for controlling the first and second caches, the cache control device selecting in advance the first to third address buses prior to comparing the output of the second address bus with the output of the first cache and comparing the output of the third address bus with the outputs of the second caches.

And a second cache control device of the present invention comprises;

a first register having a first address bus connected to its input side, having a second address bus connected to its output side, and being driven by a clock signal, a second register having the second address bus connected to its input side, having a third address bus connected to its output side, and being driven by a clock signal, a third register having the third address bus connected to its input side, having a fourth address bus connected to its output side, and being driven by a clock signal, a first cache having the first address bus connected to its input side, a second cache having the second address bus connected to its input side, a third caches each having the third address bus connected to its input side, a first comparator for comparing the output of the second address bus with the output of the first cache, a second comparator for comparing the output of the third address bus with the output of the second cache, a third comparators for comparing the output of the fourth address bus with the outputs of the third caches, a first multiplexer for selecting data of the first or second comparator, or the third comparators, a second multiplexer for selecting data of the first or second cache, or the third caches, and an access controller for controlling the first, second and third caches, the cache control device selecting in advance the first to fourth address buses prior to comparing the output of the second address bus with the output of the first cache, comparing the output of the third address bus with the output of the second cache and comparing the output of the fourth address bus with the outputs of the third caches.

Further, a cache control device of the present invention adopts various preferred application forms as described below.

That is to say, a cache control device of the present invention is a set associative cache device.

And the first cache of a cache control device of the present invention has a first tag RAM for receiving the first address data, and the second cache has a second tag RAM for receiving the second address data.

And the first and second caches of a cache control device of the present invention each have a data RAM controlled by the access controller.

And the first comparator of a cache control device of the present invention compares the output of the second address bus with the output of the first tag RAM, and the second comparators compare the output of the third address bus with the outputs of the second tag RAMs.

And a cache control device of the present invention has the caches of five or more in number, or the cache control device has the comparators of five or more in number.

DETAILED DESCRIPTION OF THE PREFERRED EMBODIMENTS

Next, embodiments of the present invention are described with reference to the drawings.

Figure 3:
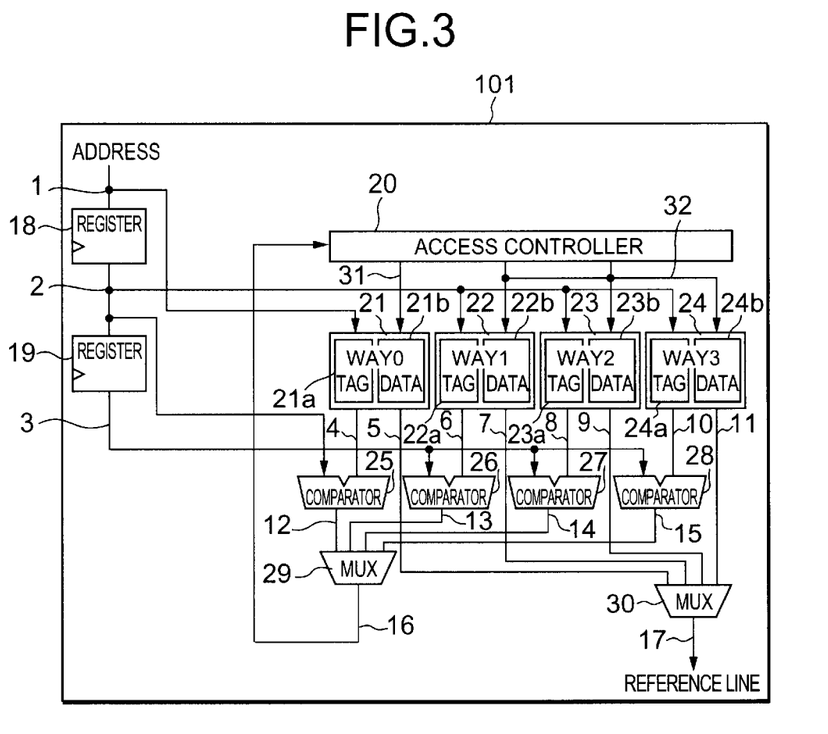
FIG. 3 is a block diagram of a cache control device of a first embodiment of the present invention.

FIG. 3 is a block diagram showing the composition of a cache control device of a first embodiment of the present invention, which is a composition example of a 4-way set associative cache device.

Referring to FIG. 3, a cache control device 101 of the first embodiment of the present invention has a first register 18 which receives a signal of a first address bus 1, outputs its output to a second address bus and is driven by a clock signal, and a second register 19 which receives a signal of a second address bus 2, outputs its output to a third address bus and is driven by a clock signal.

Further, the cache control device 101 of the first embodiment of the present invention has a way-0 way cache (21) having a first address bus 1 connected to its input side and receiving a signal of the first address bus 1, a way-1 cache (22), a way-2 way cache (23) and a way-3 way cache (24) each having the second address bus 2 way connected to its input side and receiving a signal of the second address bus 2, a comparator 25 for comparing the output of the second address bus 2 way with the output of the way-0 cache (21), a comparator 26 for comparing the output of a third address bus 3 way with the output of the way-1 cache (22), a comparator 27 for comparing the output of the third address bus 3 way with the output of the way-2 way cache (23), a comparator 28 for comparing the output of the third address bus 3 with the output of the way-3 cache (24), a first multiplexer 29 for selecting at least one data within data of the comparator (25, 26, 27 and 28), a second multiplexer 30 for selecting at least one data within data of the way-0 cache (21), data of the way-1 cache (22), data of the way-2 cache (23) and data of the way-3 cache (24), and an access controller 20 for controlling the way-0 cache (21), the way-1 cache (22), the way-2 cache (23) and the way-3 cache (24).

Furthermore, the cache control device 101 of the first embodiment of the present invention is composed so as to select in advance one of the first to third address buses (1, 2 and 3) prior to comparing the output of the second address bus 2 with data 4 of the way-0 cache (21) and comparing the output of the third address bus 3 with data of the way-1 cache (22), data of the way-2 cache (23) and data of the way-3 cache (24).

And further, the way-0 cache (21) has a tag RAM 21a for receiving data of the first address bus 1 and a data RAM 21b for receiving control data of the access controller 20.

Moreover, the way-1 cache (23) has a tag RAM 22a for receiving data of the second address bus 2 and a data RAM 22b for receiving control data of the access controller 20.

Still further, the way-2 cache (23) has a tag RAM 23a for receiving data of the second address bus 2 and a data RAM 23b for receiving control data of the access controller 20, and the way-3 cache (24) has a tag RAM 24a for receiving data of the second address bus 2 and a data RAM 24b for receiving control data of the access controller 20.

And the cache control device 101 of the first embodiment of the present invention, in order to reduce the electric power consumption of the cache control device 101 in a case of judgment of a cache hit or miss-hit, does not simultaneously compare the tag RAM 21a of the way-0 cache (21), the tag RAM 22a of the way-1 cache (22), the tag RAM 23a of the way-2 cache (23) and the tag RAM 24a of the way-3 cache (24) with the value of an address bus, but first compares tag RAM data 4 of the tag RAM 21a read by the way-0 cache (21) with data of the address bus 2 and, when no coincidence has been obtained as a result, compares respectively tag RAM data 6 of the tag RAM 22a read by the way-1 cache (22), tag RAM data 8 of the tag RAM 23a read by the way-2 cache (23) and tag RAM data 10 of the tag RAM 24a read by the way-3 cache (24) with data of the address bus 3. Output 2 of the register 18 is obtained by latching the value of the address bus 1 and has an address value at the time two clocks earlier than a reference observation time. The address bus 1 is connected to the way-0 cache (21) and the address bus 2 is connected to the way-1 cache (22), the way-2 cache (23) and the way-3 cache (24), and a cache line having an index corresponding to each of these addresses is outputted as tag RAM data (4, 6, 8 or 10) and data RAM data (5, 7, 9 or 11). The way-0 cache (21), way-1 cache (22), way-2 cache (23) and way-3 cache (24) are controlled by the access controller 20, and only tag RAM data and data RAM data of a way cache are outputted when the way cache is activated by the Enable signal (31 or 32). Data 4 of the tag RAM 21a read from the way-0 cache (21) is inputted into the comparator 25, data 6 of the tag RAM 22a read from the way-1 cache (22) is inputted into the comparator 26, data 8 of the tag RAM 23a read from the way-2 cache (23) is inputted into the comparator 27, and data 10 of the tag RAM 24a read from the way-3 cache (24) is inputted into the comparator 28, and the tag RAM data 4 of the way 0 is compared with the data of the second address bus 2, the tag RAM data 6 of the way 1 is compared with the data of the third address bus 3, the tag RAM data 8 of the way 2 is compared with the data of the third address bus 3, and the tag RAM data 10 of the way 3 is compared with the data of the third address bus 3.

Comparison result signals (12, 13, 14 and 15) are inputted into the selector 29, and the way of a cache read is selected. As a result of comparison (signal 16), if a hit is obtained, a cache hit is determined, output data of the data RAM of a way selected by the selector 30 out of output data (5, 7, 9 and 11) of the data RAMs is outputted through a reference line 17.

As a result of comparison (signal 16), when a miss-hit is obtained, the access controller 20 selects the remaining ways 1 to 3 and repeats the same comparison as described above. As a result, when a hit or miss-hit signal 16 indicates a miss-hit, a true cache miss-hit is taken.

Next, the operation of the cache control device of the first embodiment of the present invention is described. First, the operation in case of obtaining a cache hit in the way 0 is described with reference to the composition example of FIG. 3 and the timing chart of FIG. 4.

Figure 4:
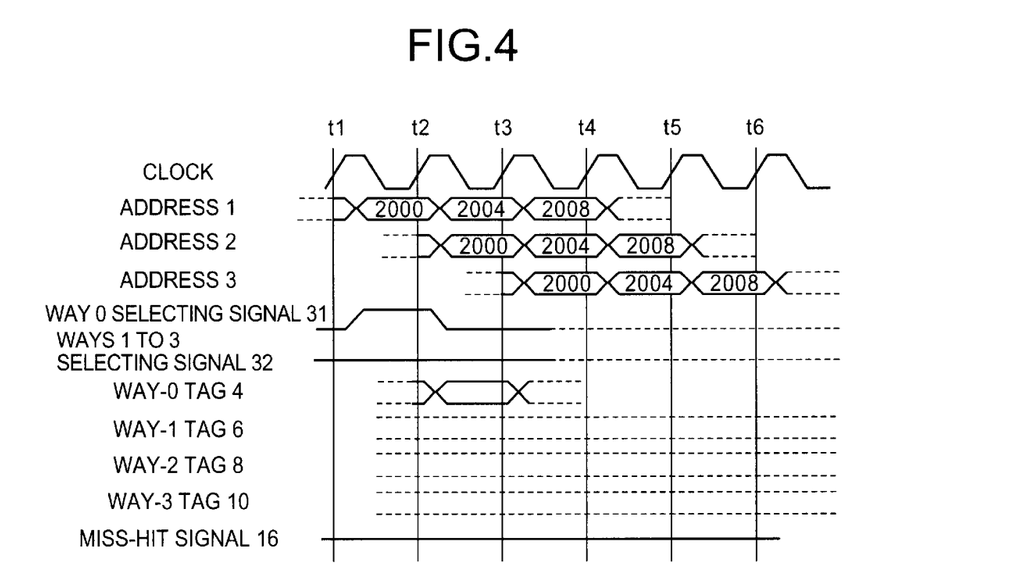
FIG. 4 is a timing chart for explaining the operation of the cache control device of the first embodiment of the present invention.

In the cache control device of the first embodiment of the present invention, at time t1 in FIG. 4 an Enable signal 31 for the way 0 is asserted by the access controller 20, and the address 1 is accessed by the way 0l of a cache.

At time t2 in FIG. 4, in the cache control device of the first embodiment of the present invention, tag RAM data 4 and data RAM data 5 corresponding to the address 1 are outputted from the way 0. The outputted tag RAM data 4 of the way 0 is inputted into the comparator 25 and is compared with the address 2, and the two are matched with each other. The data RAM data 5 of the way 0 is outputted through the reference line 17 to the outside.

Next, the operation in case of obtaining a cache hit in one of the ways 1, 2 and 3 is described with reference to the composition example of FIG. 3 and the timing chart of FIG. 5.

Figure 5:
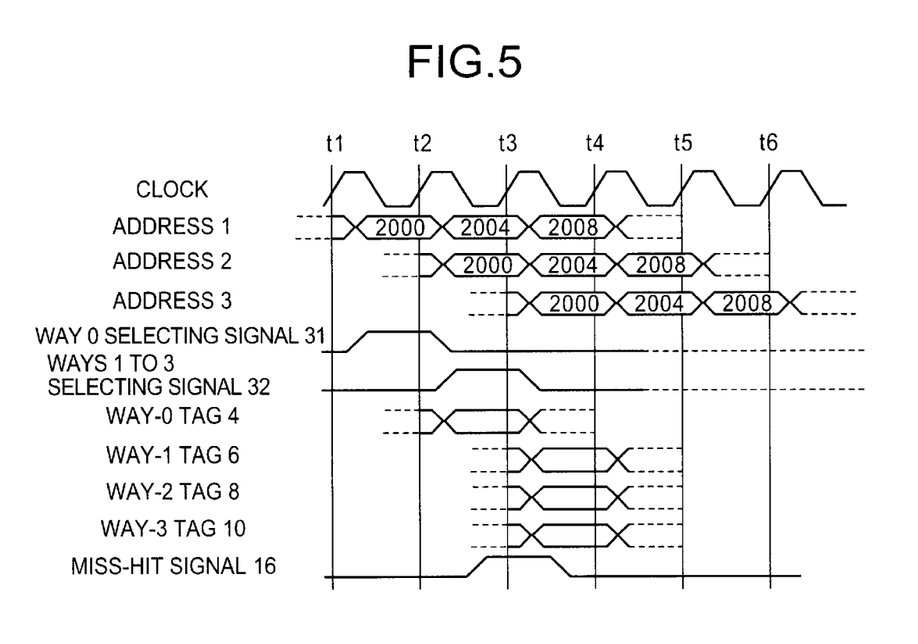
FIG. 5 is a timing chart for explaining a cache hit of the cache control device of the first embodiment of the present invention.

In the cache control device of the first embodiment of the present invention, at time t1 in FIG. 5 the address 1 is accessed by the way 0 of a cache and an Enable signal 31 for the way 0 is asserted by the access controller 20.

At time t2 in FIG. 5, in the cache control device of the first embodiment of the present invention, tag RAM data 4 and data RAM data 5 corresponding to the address 1 are outputted from the way 0.

The outputted tag RAM data 4 of the way 0 is inputted into the comparator 25 and is compared with the address 2 and the two are not matched with each other, and a miss-hit signal 16 is asserted. And an Enable signal 32 for the ways 1, 2 and 3 is asserted by the access controller 20, and the address 2 is accessed by the ways 1, 2 and 3 of the caches.

At time t3 in FIG. 5, in the cache control device of the first embodiment of the present invention, tag RAM data 6, 8 and 10, and data RAM data 7, 9 and 11 corresponding to the address 2 are outputted from the ways 1, 2 and 3, respectively.

The outputted tag RAM data 6, 8 and 10 of the ways 1, 2 and 3 are respectively inputted into the comparators 26, 27 and 28 and are compared with the address 3 and one of those tag RAM data 6, 8 and 10 is matched with the address 3. The matched tag RAM data of the way cache is outputted through the reference line 17 to the outside.

Next, the operation in case of encountering a cache miss-hit is described with reference to the composition example FIG. 3 and the timing chart of FIG. 6.

Figure 6:
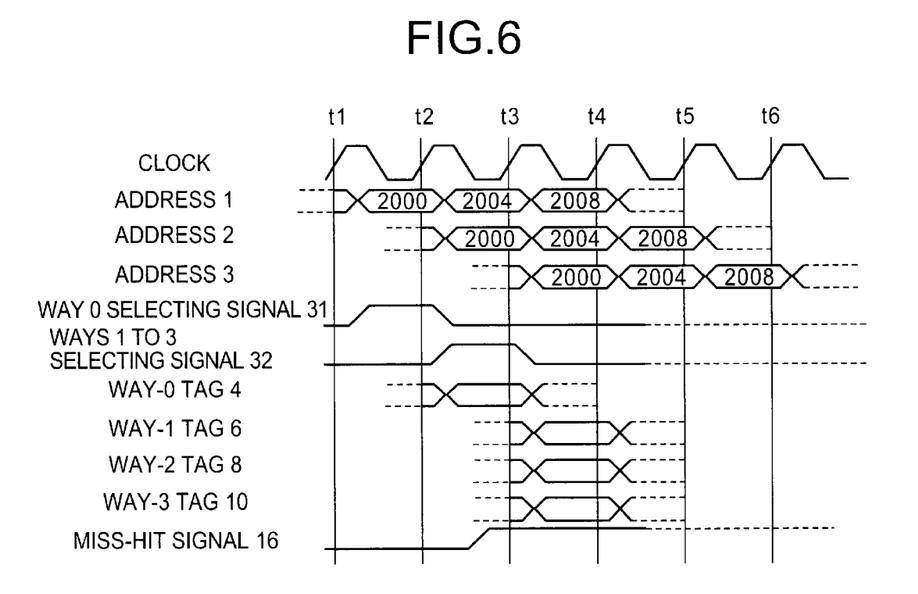
FIG. 6 is a timing chart for explaining a cache miss-hit of the cache control device of the first embodiment of the present invention.

In the cache control device of the first embodiment of the present invention, at time t1 in FIG. 6 the address 1 is accessed by the way 0 of a cache and an Enable signal 31 for the way 0 is asserted by the access controller 20.

At time t2 in FIG. 6, in the cache control device of the first embodiment of the present invention, tag RAM data 4 and data RAM data 5 corresponding to the address 1 are outputted from the way 0. The outputted tag RAM data 4 of the way 0 is inputted into the comparator 25 and is compared with the address 2 and the two are not matched with each other, and a miss-hit signal 16 is asserted.

And an Enable signal 32 for the ways 1, 2 and 3 is asserted by the access controller 20, and the address 2 is accessed by the ways 1, 2 and 3 of the caches.

At time t3 in FIG. 6, in the cache control device of the first embodiment of the present invention, tag RAM data 6, 8 and 10, and data RAM data 7, 9 and 11 corresponding to the value of the address 2 are outputted from the ways 1, 2 and 3, respectively.

The outputted tag RAM data 6, 8 and 10 of the ways 1, 2 and 3 are respectively inputted into the comparators 26, 27 and 28 and are compared with the value of the address bus 3 and all of those tag RAM data are not matched with it.

Next, other embodiments of the present invention are described with reference to the drawings.

Figure 7:
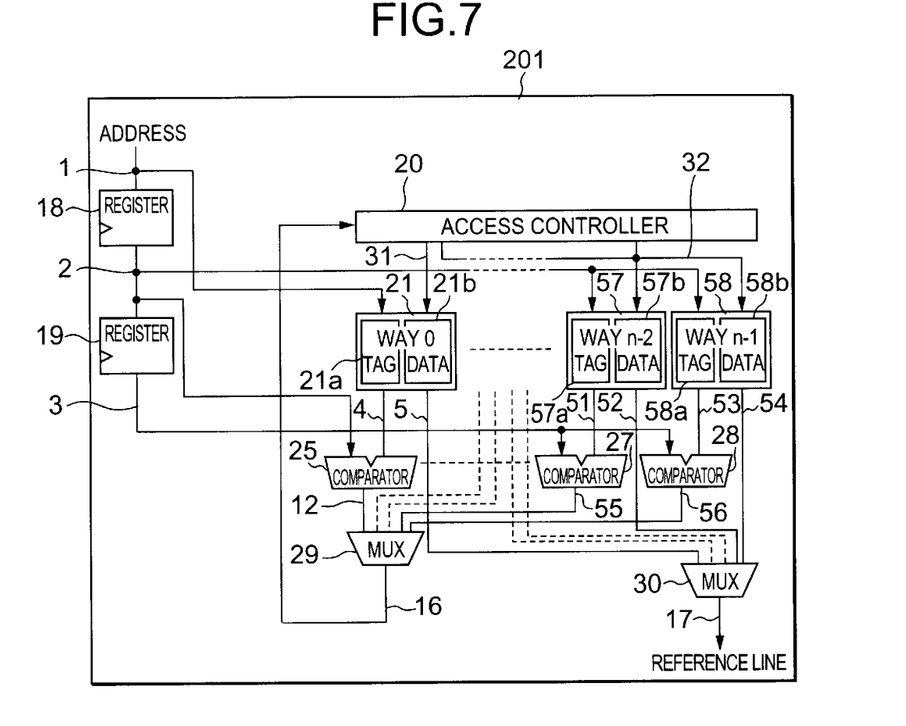
FIG. 7 is a block diagram of a cache control device of a second embodiment of the present invention.
Figure 8:
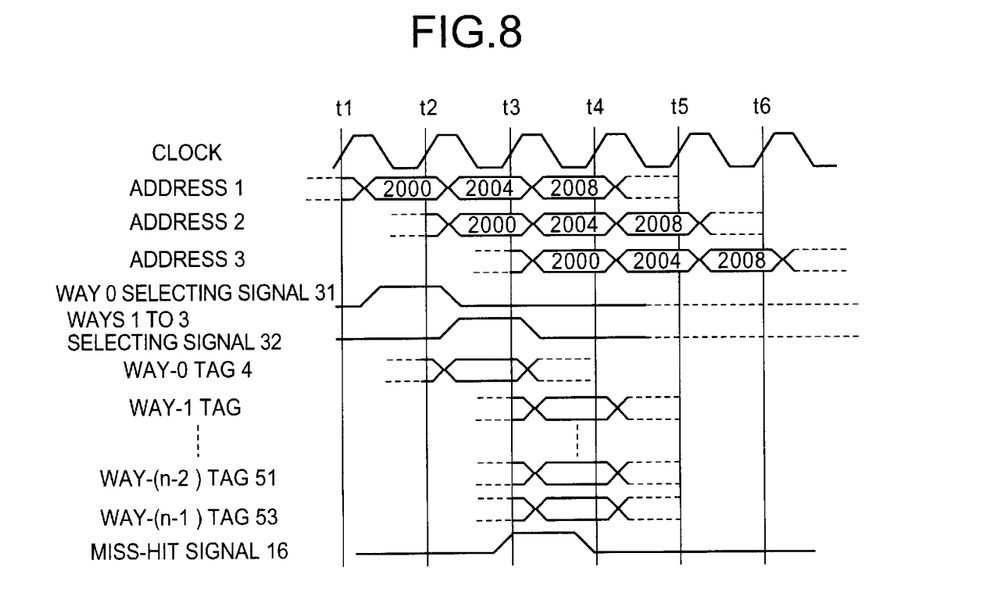
FIG. 8 is a timing chart for explaining the operation of the cache control device of the second embodiment of the present invention.

A cache control device of a second embodiment of the present invention is further contrived with regard to the number of ways of caches and addresses to be selected. A composition example of it is shown in FIG. 7 and a timing chart of it is shown in FIG. 8. A cache control device of the second embodiment of the present invention uses n way set associative caches, and at time t1 in FIG. 8 an address bus 1 is accessed by the way 0 of a cache and an Enable signal 31 for the way 0 is asserted by an access controller 20.

At time t2 in FIG. 8, in the cache control device of the second embodiment of the present invention, tag RAM data 4 and data RAM data 5 corresponding to the value of the address bus 1 are outputted from the way 0. The outputted tag RAM data 4 of the way 0 is inputted into the comparator 25 and is compared with the value of an address bus 2 and when they are not matched with each other, a miss-hit signal 16 is asserted.

An Enable signal 32 for the ways 1 to (n−1) is asserted by the access controller 20, and the address 2 is accessed by the ways 1 to (n−1) of the caches.

At time t3 in FIG. 8, in the cache control device of the second embodiment of the present invention, tag RAM data and data RAM data corresponding to the value of the address 2 are outputted from the ways 1 to (n−1). The outputted tag RAM data of the ways 1 to (n−1) are respectively inputted into the comparators and are compared with the value of the address bus 3.

Figure 9:
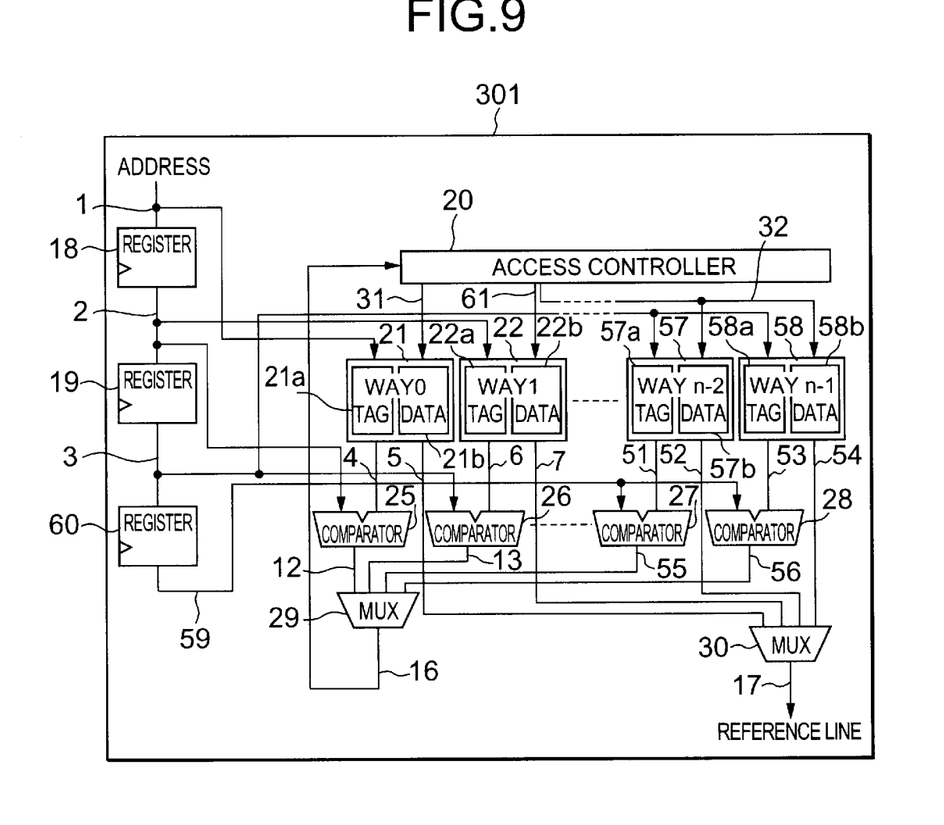
FIG. 9 is a block diagram of a cache control device of a third embodiment of the present invention.
Figure 10:
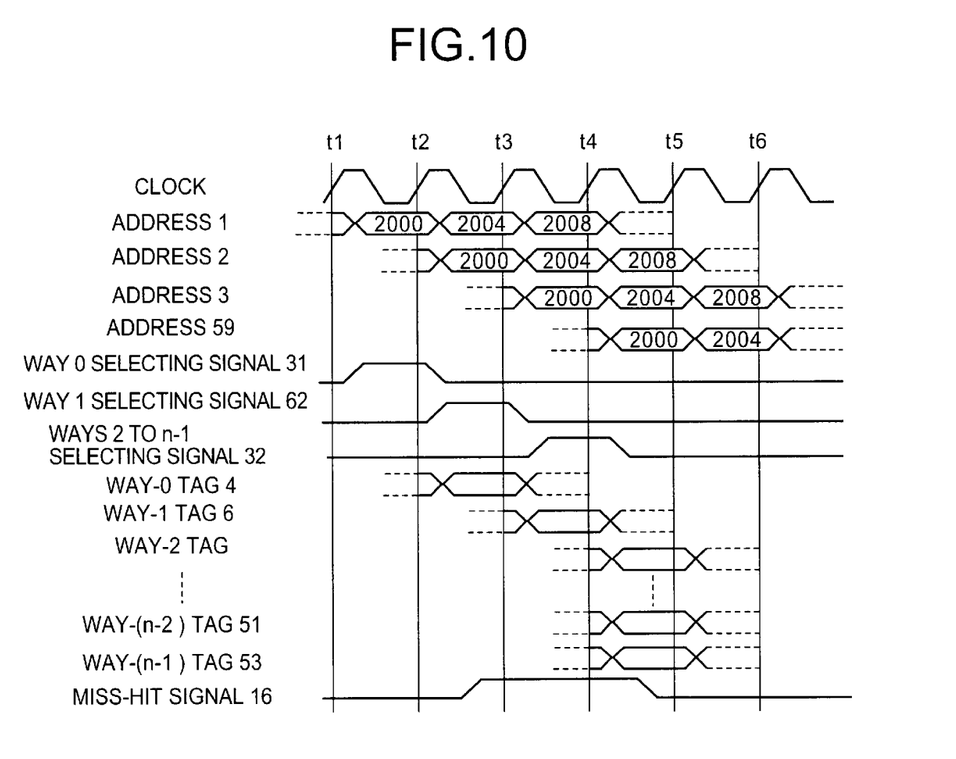
FIG. 10 is a timing chart for explaining the operation of the cache control device of the third embodiment of the present invention.

Next, a composition example and a timing chart of a cache control device of a third embodiment of the present invention are shown in FIG. 9 and FIG. 10, respectively.

The cache control device of the third embodiment of the present invention uses n way set associative caches, and spends up to 3 clock periods for judgment of a cache hit or miss-hit.

In the cache control device of the third embodiment of the present invention, at time t1 in FIG. 10 an address bus 1 is accessed by the way 0 of a cache and an Enable signal 31 for the way 0 is asserted by an access controller 20.

At time t2 in FIG. 10, in the cache control device of the third embodiment of the present invention, tag RAM data 4 and data RAM data 5 corresponding to the value of the address bus 1 are outputted from the way 0. The outputted tag RAM data 4 of the way 0 is inputted into the comparator 25 and is compared with the value of an address bus 2 and when they are not matched with each other, a miss-hit signal 16 is asserted.

An Enable signal 61 for the way 1 is asserted by the access controller 20, and the address bus 2 is accessed by the way 1 of the cache.

At time t3 in FIG. 10, in the cache control device of the third embodiment of the present invention, tag RAM data 6 nd data RAM data 7 corresponding to the value of the address 2 are outputted from the way 1. The outputted tag RAM data 6 of the way 1 is inputted into a comparator 26 and is compared with the data of the third address bus 3.

As a result when they are not matched with each other, a miss-hit signal 16 is asserted.

An Enable signal 32 for the ways 2 to (n−1) is asserted by the access controller 20, and the address bus 3 is accessed by the ways 2 to (n−1) of the caches.

At time t4 in FIG. 10, in the cache control device of the third embodiment of the present invention, tag RAM data and data RAM data corresponding to the address bus 3 are outputted from the ways 2 to (n−1). The outputted tag RAM data of the ways 2 to (n−1) are respectively inputted into comparators and are compared with the data of the forth address bus 59.

In the cache control devices of the above-mentioned embodiments of the present invention, the order of comparison adopts an order of starting at the way 0 and proceeding to the ways 1, 2 and 3, but can adopt also another order of starting at another way.

As described above, according to a cache control device of the present invention, the cache control device of the present invention has a set associative cache composition and can select in advance each way prior to comparing tag RAM with an address.

When the comparison of tag RAM of a way with an address results in no coincidence, since an address to be used in the next comparison of a way has been already selected, the comparison of tag RAM of the way with it can be performed at a high speed.

That is to say, in a set associative cache device which does not simultaneously compare all ways with an address, when no coincidence is encountered as a result of comparison at time t2 in FIGS. 4 to 6, FIG. 8 and FIG. 10, by preparing in advance addresses necessary for the respective ways at the stage of time t1 in FIGS. 4 to 6, FIG. 8 and FIG. 10, instead of selecting an address for reading a necessary cache at time t3 in FIGS. 4 to 6, FIG. 8 and FIG. 10 after confirming a miss-hit signal 16, the time required for doing so can be saved. Therefore, an effect of enabling a cache to operate at a higher speed is obtained.

What is claimed is:

1. A cache control device comprising;
    a first register having a first address bus connected to its input side, having a second address bus connected to its output side, and being driven by a clock signal,
    a second register having said second address bus connected to its input side, having a third address bus connected to its output side, and being driven by a clock signal,
    a first cache having said second address bus connected to its input side,
    a second cache each having said second address bus connected to its input side,
    a first comparator for comparing the output of said second address bus with the output of said first cache,
    a second comparator for comparing the output of said third address bus with the outputs of said second caches,
    a first multiplexer for selecting at least one data of said first and second comparator,
    a second multiplexer for selecting at least one data of said first and second cache, and
    an access controller for controlling said first and second caches,
    said cache control device selecting in advance said first to third address buses prior to comparing the output of said second address bus with the output of said first cache and comparing the output of said third address bus with the outputs of said second caches.

2. A cache control device according to claim 1, said cache control device is a set associative cache device.

3. A cache control device according to claim 1, wherein;
    said first cache has a first tag RAM for receiving said first address data, and said second cache has a second tag RAM for receiving said second address data.

4. A cache control device according to claim 1, wherein;
    said first and second caches each have a data RAM controlled by said access controller.

5. A cache control device according to claim 1, wherein;
    said first comparator compares the output of said second address bus with the output of said first tag RAM, and said second comparators compare the output of said third address bus with the outputs of said second tag RAMs.

6. A cache control device according to claim 1, wherein;
    said cache control device has said caches of five or more in number.

7. A cache control device according to claim 1, wherein;
    said cache control device has said comparators of five or more in number.

8. A cache control device comprising;
    a first register having a first address bus connected to its input side, having a second address bus connected to its output side, and being driven by a clock signal,
    a second register having said second address bus connected to its input side, having a third address bus connected to its output side, and being driven by a clock signal,
    a third register having said third address bus connected to its input side, having a fourth address bus connected to its output side, and being driven by a clock signal,
    a first cache having said first address bus connected to its input side,
    a second cache having said second address bus connected to its input side,
    a third caches each having said third address bus connected to its input side,
    a first comparator for comparing the output of said second address bus with the output of said first cache,
    a second comparator for comparing the output of said third address bus with the output of said second cache,
    a third comparators for comparing the output of said fourth address bus with the outputs of said third caches,
    a first multiplexer for selecting at least one data of said first and second comparator, and said third comparators,
    a second multiplexer for selecting at least one data of said first and second cache, and said third caches, and an access controller for controlling said first, second and third caches, said cache control device selecting in advance said first to fourth address buses prior to comparing the output of said second address bus with the output of said first cache, comparing the output of said third address bus with the output of said second cache and comparing the output of said fourth address bus with the outputs of said third caches.

9. A cache control device according to claim 8, said cache control device is a set associative cache device.

10. A cache control device according to claim 8, wherein;

said first cache has a first tag RAM for receiving said first address data, and said second cache has a second tag RAM for receiving said second address data.

11. A cache control device according to claim 8, wherein; said first and second caches each have a data RAM controlled by said access controller.

12. A cache control device according to claim 8, wherein; said first comparator compares the output of said second address bus with the output of said first tag RAM, and said second comparators compare the output of said third address bus with the outputs of said second tag RAMs.

13. A cache control device according to claim 8, wherein; said cache control device has said caches of five or more in number.

14. A cache control device according to claim 8, wherein; said cache control device has said comparators of five or more in number.

* * * * *